Dec. 31, 1940.   A. P. FERGUESON   2,226,857
FENDER SHIELD AND FENDER SHIELD MOUNTING
Filed Aug. 27, 1938   4 Sheets-Sheet 1
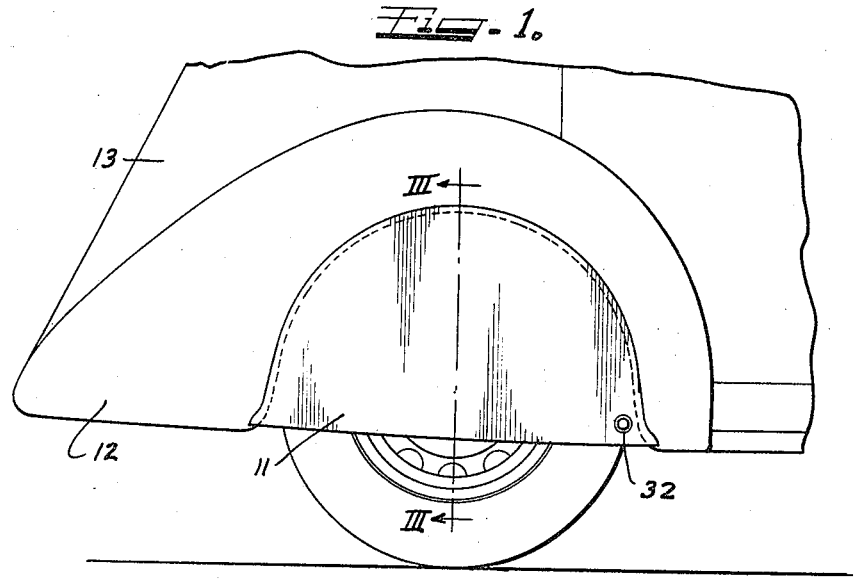
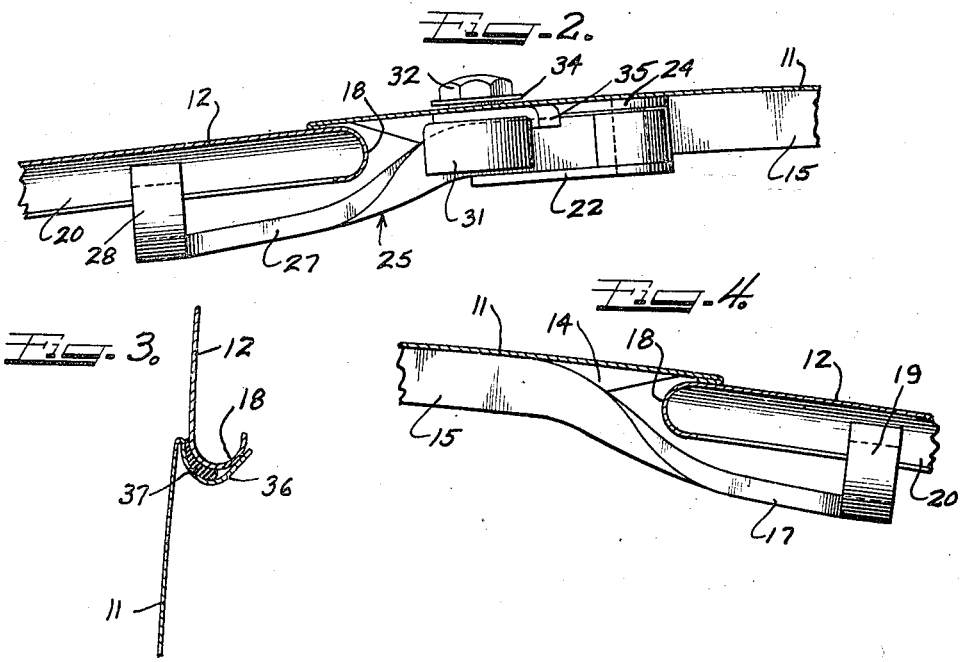
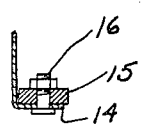
Inventor
ARTHUR P. FERGUESON.
by
Attys.

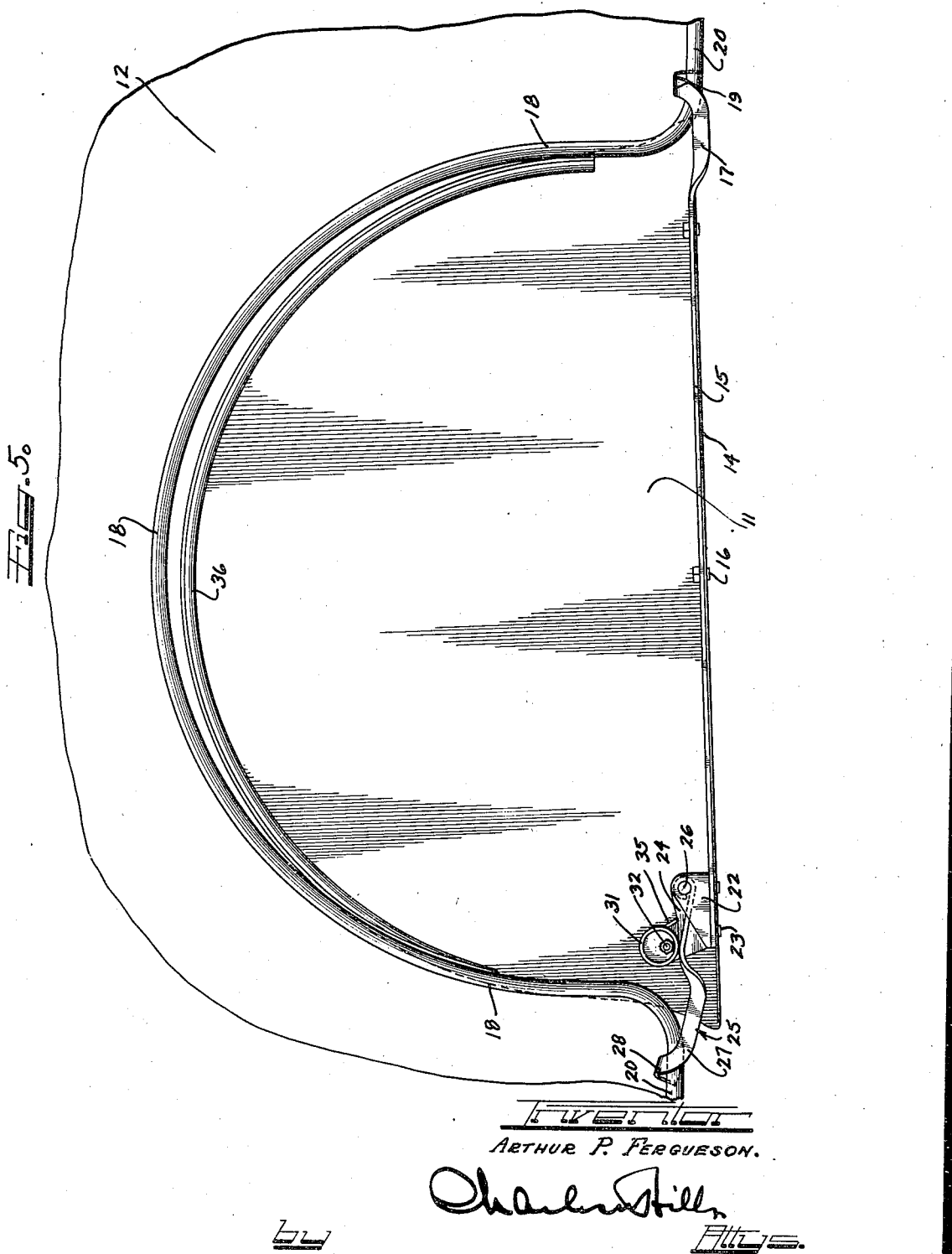

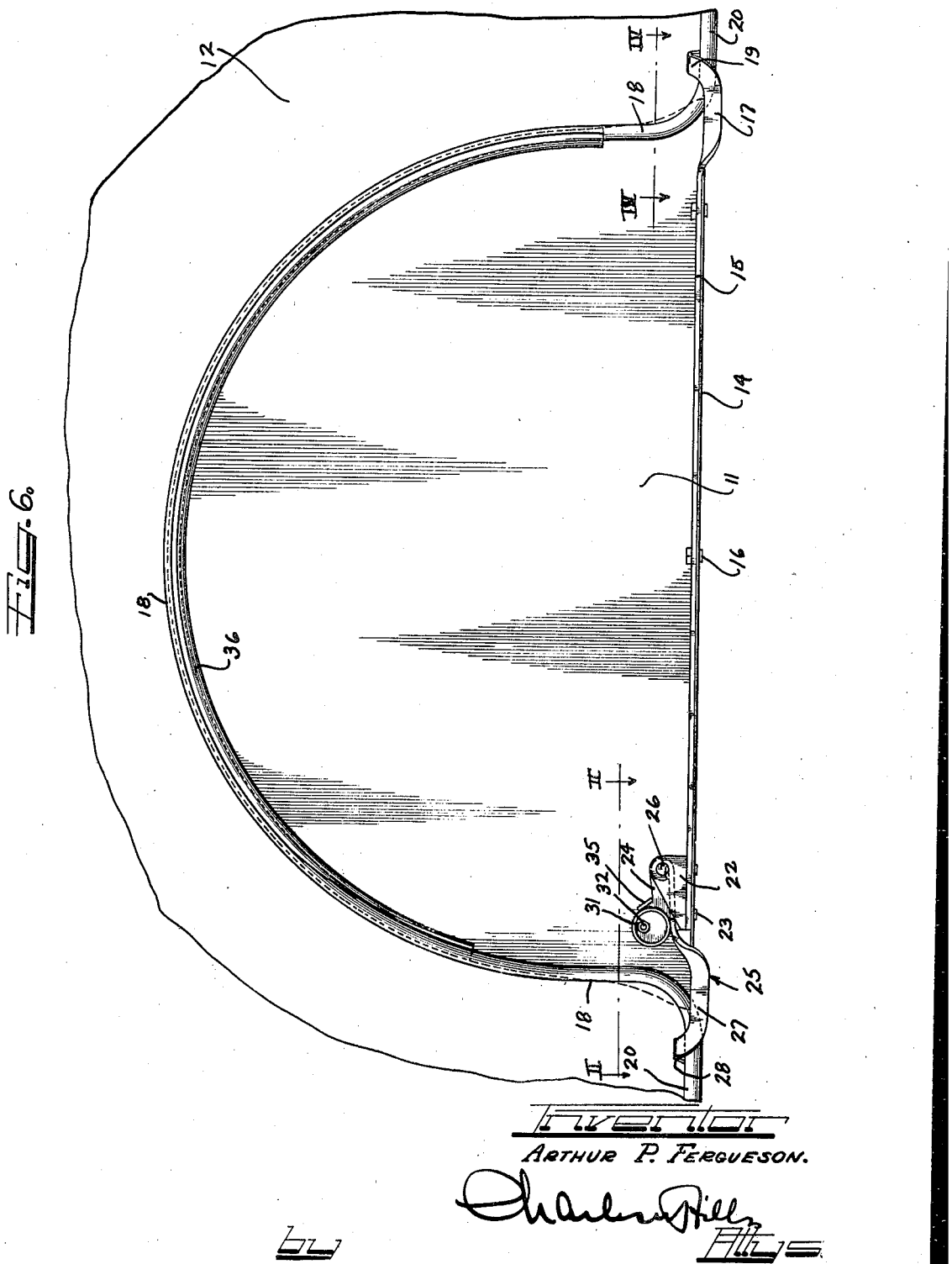

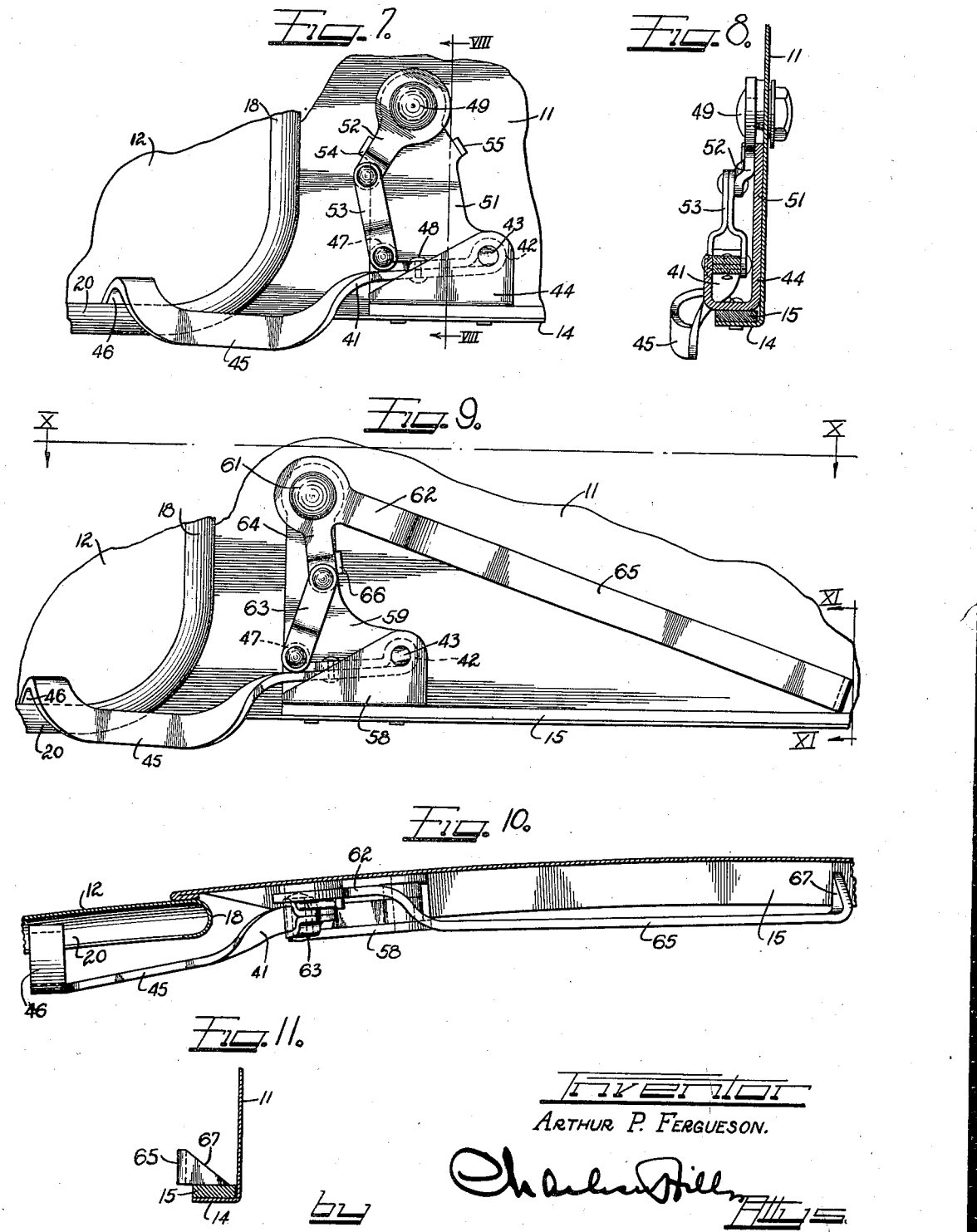

Patented Dec. 31, 1940

2,226,857

UNITED STATES PATENT OFFICE 2,226,857

FENDER SHIELD AND FENDER SHIELD MOUNTING

Arthur P. Fergueson, Detroit, Mich., assignor to Houdaille-Hershey Corporation, Detroit, Mich., a corporation of Michigan Application August 27, 1938, Serial No. 227,029

17 Claims. (Cl. 280—153)

This invention relates to ornamental fender skirts, and more particularly to a novel means for securing an ornamental fender skirt in position on a vehicle fender.

In designing ornamental fender skirts, or shields, of the type which is adapted to cover the usual access opening of a vehicle fender, it is important that the means which is employed to secure the fender skirt in position be simple and quick to operate both in assembling the fender skirt on the vehicle fender and in removing it therefrom. It must also possess the necessary degree of ruggedness when in use and be substantially free from vibration and noise.

It is an object of this invention to provide a novel and ornamental fender skirt which possesses the above highly desirable characteristics.

It is a further object of this invention to provide an improved fender skirt which is economical to manufacture and is rugged and reliable in use.

It is a further object of this invention to provide an improved mechanism for positively holding a fender skirt in place which shall be quick and easy to operate and which will not depend for its effectiveness upon a large amount of yieldability or springiness of the parts.

Another object of this invention is to provide a novel fender skirt attaching means which is positively operated by means of a cam or eccentric.

The novel features which I believe to be characteristic of my invention are set forth with particularity in the appended claims. My invention itself, both as to its organization and manner of construction, together with further objects and advantages thereof, can best be understood by reference to the following description, taken in connection with the accompanying drawings, in which:

Figure 1 is a side elevational view of the rear part of an automobile having the usual form of vehicle fender and one embodiment of my novel ornamental fender skirt mounted thereon;

Figure 2 is a cross-sectional view taken on the line II—II of Figure 6 and looking in the direction of the arrows;

Figure 3 is a cross-sectional view taken on the line III—III of Figure 1 and looking in the direction of the arrows;

Figure 4 is a cross-sectional view taken on the line IV—IV of Figure 6 and looking in the direction of the arrows;

Figure 5 is a side elevational view of the fender skirt seen mounted upon the fender, looking out from the inside of the fender;

Figure 6 is a view similar to Figure 5, showing the fender skirt after it is completely mounted on the fender;

Figure 7 is a side elevational view of a modified form of the fender skirt mounted upon the fender, looking out from the inside of the fender and showing only that portion of the fender skirt which differs from the embodiment shown in Figures 1 to 6;

Figure 8 is a cross-sectional view taken on the line VIII—VIII of Figure 7 and looking in the direction of the arrows;

Figure 9 is a side elevational view similar to Figure 7 but showing a third embodiment of the invention;

Figure 10 is a sectional view taken on the line X—X of Figure 9 and looking down in the direction of the arrows;

Figure 11 is a cross-sectional view taken on the line XI—XI of Figure 9, looking in the direction of the arrows.

In the embodiment of the invention illustrated in Figures 1 to 6, an ornamental fender skirt 11 of the trunnion supported type is mounted on a vehicle fender 12 of an automobile 13. The lower edge 14 of the fender skirt is horizontally bent to form a flange extending the length of the fender skirt and having the reinforcing bar 15 secured to it by bolts 16 or other suitable fastening elements. As shown in Figures 4 and 6, the bar 15 extends beyond the rear end of the fender skirt 11, and the projecting portion 17 of the bar is bent back away from the plane of the fender skirt in order to clear the underturned edge 18 which defines the opening of the fender 12. The extreme end of the bar 15 is formed into a hook 19 whose end fits down into the underturned lower edge 20 of the fender 12.

The bar 15 terminates short of the front end of the fender skirt 11 and has a bracket 22 secured to it in any suitable manner, as by bolts or rivets 23. The bracket 22 is U or channel-shaped in cross section and has one flat side 24 which is considerably larger than the other side and which lies against the back of the panel of the fender shield 11.

A trunnion member 25 is pivotally mounted between the two sides or flanges of the bracket 22 by means of a pin or rivet 26 so as to be able to swing vertically in a plane parallel to the fender shield 11. The trunnion member 25 is shaped like the end portion 17, 19 of the bar 11 and comprises a portion 27 off-set away from the plane of the fender shield 11 so as to clear the opening defining underturned edge 18 of the fender. The off-set portion 27 of the trunnion member 25 terminates in a hooked portion 28 which is adapted to fit into supporting engagement with the underturned base edge 20 of the fender 12.

Because of its pivotal mounting in the bracket 22, the movable trunnion member 25 can swing relative to the fender shield 11 and the parts affixed thereto, between the two positions shown in Figures 5 and 6. The movement of the trunnion member 25 between these two positions is controlled by means of a cam or eccentric 31 which is mounted on the extended flat side 24 of the bracket 22 and which engages the upper side of the trunnion member 25. The cam 31 is fixed to the end of a stud 32 which extends through the side plate or flange 24 and the panel 11 of the fender shield and which has a shoulder bearing against the outer side of the fender shield panel 11 and flange 24. This holds the cam or eccentric 31 flat against the flange or side plate 24 and prevents it from moving in any direction except around the axis of the stud 32. The outer portion of the stud 32 is formed into a hexagonal head as shown in Figures 1 and 2 by means of which a wrench may be attached to the stud for rotating it and the cam 31. A flange 34 is provided around the head of the stud 32 in order to prevent marring of the finish of the fender panel 11 by the wrench.

A lug 35 is bent up on one edge of the flange or plate 24 and forms a means for limiting the rotation of the cam 31. The lug or stop 35 is placed so that the cam 31 will come into contact with it and be stopped in the position shown in Figure 6, in which the cam 31 has swung the movable trunnion member 25 to its lowermost position and has just passed dead center.

The curved edge portion of the fender skirt 11 is bent back upon itself as shown in Figure 3 and is formed into an inwardly directed U-shaped flange 36 which engages the opening defining underturned edge 18 of the fender 12 when the fender shield 11 is in position. As may be seen from Figures 5 and 6, the channel shaped flange 36 terminates a considerable distance short of the bottom of the fender skirt 11 on the end which is provided with the movable trunnion member 25 and the portion of the flange 36 which fits on the inside of the inturned edge 18 of the fender tapers down to a very narrow width at that end. The purpose of this may be seen from Figure 5, which shows the fender skirt as it is being mounted in position. In mounting the fender shield 11 in place upon the fender 12, the fender shield is first held with its upper portion sloping out at a considerable angle to the vertical and the hook portions 19 and 28 on the reinforcing bar 15 and the movable trunnion member 25 are passed up behind the fender 12 and hooked into the upturned flange 20 on the bottom of the fender. The fender shield 11 is then swung up into a vertical position as shown in Figure 5, this being permitted by the fact that at one side and at the top the U-shaped flange 36 is swung away from the adjacent edge of the fender, as shown in Figure 5, and by the fact that at the other side of the fender shield 11 the inner wall of the U-shaped flange 36 narrows down and the entire flange 36 terminates a considerable distance above the lower edge of the fender skirt 11. After the fender skirt 11 is in the position shown in Figure 5, a wrench is applied to the stud 32 and the cam 31 rotated from the position shown in Figure 5 to the position shown in Figure 6. This causes the movable trunnion member 25 to swing down with respect to the fender shield 11 and swing the entire fender shield up into place, the hooked end portion 19 of the reinforcing bar 15 serving as a pivotal support about which the fender shield rotates.

With the fender shield in its final position as shown in Figure 6, the channel shaped flange 36 embraces the upturned edge 18 of the fender and holds the upper portion of the fender shield against lateral displacement. A strip 37 of non-metallic resilient material, such as rubber, is secured in the outwardly facing channel-shaped flange 36 and prevents marring of the finish of the fender. The lower portion of the fender skirt 11 is held in place by the hooked portions 19 and 28 of the bar 15 and the trunnion member 25 which engage the upturned flanges 20 on the bottom of the fender. Since the projecting portion 17 of the bar 15 and the trunnion member 25 are resilient, they press the fender shield 11 upward into tight engagement with the fender and prevent any rattling or other noise. The resilient non-metallic strip 37 around the top of the fender shield also aids in the prevention of rattling or other noise.

A second embodiment of the invention is shown in Figures 7 and 8. This comprises a sheet metal panel 11 which fits into the wheel access opening in a fender 12 and whose lower edge 14 is formed into a horizontal flange, on top of which is secured a reinforcing bar 15. In these respects and in the way in which it swings up into position, this form of the invention is exactly the same as the one shown in Figures 1 to 6. The difference between the two forms lies in the movable trunnion member 41 and the manner in which it is supported and actuated.

The inner end of the movable trunnion 41 is formed into a loop 42 through which a pivot 43 extends, and the pivot 43 is carried by the sides of a channel-shaped bracket 44 riveted on the top of the bar 15. The outer end of the trunnion member 41 is shaped like the outer end of the trunnion member 25 in the first form of the invention and comprises a portion 45 offset away from the plane of the fender shield 11 so as to clear the underturned edge 18 of the fender, and a hook-shaped end 46 which is adapted to fit down into the channel-like underturned edge on the fender.

The end of the trunnion member 41 which forms the loop 42 also extends back upon itself on top of the main part of the trunnion member and its extreme end is formed into a second loop or eye 47. The two superposed portions of the trunnion member 41 are firmly secured to each other by means of a rivet 48 which is spaced a short distance from the eye 47 so that the hole through which it passes will not weaken the trunnion member 41 at the point of greatest stress immediately under the eye 47.

The trunnion member 41 is operated by a stud 49 which is journaled in an extension 51 of one side of the bracket 44 and which has a head on the outside of the fender shield similar to the head of the stud 32 shown in Figures 1 and 2. An arm 52 is fixed to the stud 49 and its outer end is connected to the loop or eye 47 on the top of the trunnion member 41 by means of a short link 53. Two lugs or ears 54 and 55 are bent up from the edges of the side 51 of the bracket and form stops for limiting the movement of the arm 52. One stop 54 is placed so as to allow the arm 52 to swing just past a position in which it is in line with the link 53. In other words, this stop 54 allows the linkage to swing just past dead center so that the resiliency of the trunnion member 41, which causes an upward pressure on the link 53 when the fender shield is in place, will tend to hold the arm 52 against the stop 54. The other stop 55 is placed so as to limit the movement of the arm 52 in the other direction and to prevent the trunnion member 41 from swinging up farther than is necessary to allow the fender shield to be easily placed in position.

A third embodiment of the invention is shown in Figures 9 to 11. This embodiment, in general, is similar to that shown in Figures 7 and 8 but differs therefrom chiefly in that the link mechanism is operated by a lever on the back of the fender shield rather than by a stud extending through the fender shield panel. In this form of the invention a bracket 58, somewhat similar to the bracket 44 of the previously described form of the invention, carries a pivot 43 for a movable trunnion member 41 and has one side 59 which extends up and carries a pivot 61 for the lever 62 by means of which the trunnion member 41 is operated.

The lever 62 comprises a short arm 64, which is connected by a link 63 to the eye 47 on top of the trunnion member 41, and a long arm 65 which forms a handle by means of which it is operated. A lug 66 is formed on one edge of the side 59 of the bracket 58 and forms a stop for the arm 64 of the lever 62. The lug or stop 66 is positioned so that it stops the rotation of the lever 62 at a point which is just beyond the position in which the link 63 and the short arm 64 of the lever are in line. In other words, the lug 66 stops the rotation of the lever 62 just beyond the dead center position so that the upward pressure exerted by the resiliency of the movable trunnion member 41 will hold the lever against the stop 66.

The direction of rotation of the lever 62 as its short arm 64 moves toward the stop 66 is such as to carry the handle 65 up behind the fender shield. Thus, when the fender shield is in position, the handle 65 will be concealed but it will be easily accessible by reaching up under the edge of the fender shield. In order to further insure that the fender shield locking mechanism will remain in the locked position shown in the drawings, the end of the handle 65 is bent into a detent 67 adapted to rest on top of the reinforcing bar 15. This prevents any jolts or jars from accidentally causing the handle 65 to swing down and release the locking mechanism. When it is desired to remove the fender shield, the handle 65, which is long and somewhat flexible in a lateral direction, is brought out away from the fender shield until its end 67 is clear of the bar 15, and then the handle 65 is swung down and operates the trunnion member 41, moving it from the position shown in Figure 9 to a position similar to that occupied by the trunnion member 25 in Figure 5. The top of the fender shield is then swung out away from the fender and the entire fender shield lifted up and removed in the same way as in the other forms of the invention.

From the above description, it will be apparent that I have provided extraordinary simple means for securing an ornamental fender skirt to a vehicle fender. Although the vehicle fender has been illustrated as being of the high crown type having underturned marginal edges, it is to be understood that the ornamental fender skirt may be employed with equal success with any type of fender having underturned marginal edges or the like, or even with bodies which are wide enough to make separate fenders unnecessary but which are merely provided with wheel access openings in the sides. In view of this, the term "fender shield" as used in the claims is to be interpreted as being a cover for any wheel access opening, whether in a fender or not, and the term "fender" is to be understood as including, not only a fender, but also the side of a body where that side performs the functions of a fender.

While I have shown only three particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In an ornamental fender skirt, a pair of trunnion members projecting beyond each end of the lower edge of said fender skirt and formed to fit down into portions of a fender to support said fender skirt, one of said trunnion members being pivoted to the body of the fender skirt so as to be movable vertically, and mechanism for moving said pivoted trunnion member down from an upper position to a lower position and for positively preventing upward movement of said trunnion member beyond said upper position, said pivoted trunnion member extending far enough beyond said fender skirt in each of said positions to engage said fender and function as a support for said fender skirt.

2. In an ornamental fender skirt, a pair of trunnion members on the back of said fender skirt projecting beyond each end of the lower edge of said fender skirt and formed to fit down into portions of a fender to support said fender skirt, one of said trunnion members being pivoted to the body of the fender skirt so as to be movable vertically, means on the back of said fender skirt for moving said pivoted trunnion member down from an upper position to a lower position and for selectively holding said pivoted trunnion member against upward movement from either of said positions, said pivoted trunnion member projecting out far enough beyond said fender skirt in both of said positions to cooperate with said fender and function as a trunnion for said fender skirt.

3. In an ornamental fender skirt, a pair of trunnion members on the back of said fender skirt projecting beyond each end of the lower edge of said fender skirt and formed to fit down into portions of a fender to support said fender skirt, one of said trunnion members being pivoted to the body of the fender skirt so as to be movable vertically, means on the back of said fender skirt for pressing said pivoted trunnion member down and for preventing said pivoted trunnion member swinging up beyond a position in which it can operate as a trunnion, and means accessible from the front of said fender skirt for operating said first mentioned means.

4. The combination of a sheet metal fender skirt panel having its upper edge formed to embrace the edge of the wheel-opening in a fender, a reinforcing bar extending along the back of the fender skirt panel and secured to its lower edge, one end of said bar projecting beyond the end of the fender skirt panel and being formed into a trunnion adapted to fit down into a portion of the fender, a bracket secured to the other end of said bar behind the fender skirt panel, a second bar pivoted to said bracket and projecting beyond the adjacent end of the fender skirt panel and being formed into a second trunnion adapted to fit down into a portion of the fender, mechanism mounted on said bracket and engaging said second bar, said mechanism being constructed and arranged to prevent said second trunnion from swinging up to a position of inoperativeness as a trunnion, and means on the face of the fender skirt panel for operating said mechanism and swinging said second trunnion down into tight engagement with the fender.

5. The combination of a sheet metal fender skirt panel having its upper edge formed to embrace the edge of the wheel-opening in a fender, a reinforcing bar extending along the back of the fender skirt panel and secured to its lower edge, one end of said bar projecting beyond the end of the fender skirt panel and being formed into a trunnion adapted to fit down into a portion of the fender, a bracket secured to the other end of said bar behind the fender skirt panel, a second bar pivoted to said bracket and projecting beyond the adjacent end of the fender skirt panel and being formed into a second trunnion adapted to fit down into a portion of the fender, a shaft carried by the bracket, a cam fixed to the shaft and engaging said second bar, said cam being constructed and arranged to hold said second bar in a plurality of trunnion positions, said shaft being provided with means on the face of the fender skirt panel for rotating it, and a stop on said bracket to limit the rotation of said eccentric to a position just beyond dead center.

6. In an ornamental fender skirt assembly including a sheet metal panel having means along its upper edge for embracing the edge of the side-opening in a fender, the combination of a reinforcing bar extending from near one lower corner of the panel to near the other corner and being fastened to the panel, one end of said bar terminating short of one end of the panel and the other end projecting past the other end of the panel, a channel-like bracket fixed to the short end of said reinforcing bar and having a wide flat flange lying against the back of the sheet metal panel, a movable trunnion member pivoted between the sides of said bracket and projecting past the end of the panel, the projecting portions of said bar and said movable trunnion member being offset back away from the panel and having their extreme ends bent towards the plane of the panel and down so as to be engageable in upwardly facing channels on the lower edge of a fender at each side of the side-opening of the fender, a cam having its periphery engaging the movable trunnion member so as to be able to force said member down and having a side lying flat against the wide flat flange of said bracket, and a stud fixed to said cam and journaled in said flange, said stud holding said cam against said flange and preventing tipping of said cam and extending through the sheet metal panel to provide a means easily accessible on the outside of the fender skirt for actuating the cam.

7. In a fender skirt assembly having a movable trunnion member, a mechanism for operating said movable trunnion member comprising a flat rigid plate member on the inner side of said assembly, a cam engaging said movable trunnion member and having a flat side lying against the back of the plate member, and a stud extending through the plate member from the front of said assembly and fixed to the cam, the stud having a shoulder bearing against the front of the plate member for holding said cam against the back of said plate member and having a non-circular outer portion by means of which it may be rotated, said cam being constructed and arranged to positively limit the swinging movement of said movable trunnion member to substantially less than ninety degrees.

8. In a device for closing a wheel access opening on the side of an automotive vehicle and having means to support one end of itself on said vehicle and to engage the edge of said opening near the top of said opening, said engagement being of a character to prevent lateral movement of said device, a mechanism for lifting the other end of said device up into place and supporting it there comprising a member pivoted on said device and adapted to engage an upwardly facing surface on said vehicle adjacent said other end of said device, rotary mechanism mounted on said device and connected to said pivoted member and to swing it down, and means to stop rotation of said mechanism at a point just past the point of maximum deflection of said member by said mechanism.

9. In a fender shield assembly having means at one end to form a pivotal connection with a fender and means near the top which is engageable with the fender by means of an upward movement, a mechanism for swinging the fender shield up into place and holding it there, said mechanism comprising a member pivoted to the fender shield and adapted to engage an upwardly facing surface on the fender, and means for forcing said member in a downward direction, said means including a lever pivoted on said fender shield, a link connecting said lever to said member, and means for stopping the rotation of the lever at a point just beyond its dead center position.

10. In a fender shield assembly having means at one end to form a pivotal connection with a fender and means near the top which is engageable with the fender by means of an upward movement, a mechanism for swinging the fender shield up into place and holding it there, said mechanism comprising a member pivoted to the fender shield and adapted to engage an upwardly facing surface on the fender, and means for forcing said member in a downward direction, said means including a lever pivoted on said fender shield, and eccentric means operated by said lever and acting on said member.

11. In a fender shield assembly having means at one end to form a pivotal connection with a fender and means near the top which is engageable with the fender by means of an upward movement, a mechanism for swinging the fender shield up into place and holding it there, said mechanism comprising a member pivoted to the fender shield and adapted to engage an upwardly facing surface on the fender, a lever rotatably mounted on said fender shield, means interconnecting said member and said lever so that rotation of the lever in one direction will force said member down with an increasing mechanical advantage, and means for holding said lever in a position in which said member is approximately at its lowest position.

12. In a fender shield construction, a pair of trunnion members at the lower corners thereof for supporting the shield on a vehicle fender over the wheel opening thereof, at least one of said trunnion members being angularly movable in a plane substantially parallel to the plane of the shield between two positions in which it is operable as a trunnion, whereby when said shield is mounted on said fender it may be swung first in a direction substantially perpendicular to the plane of the shield and may then be swung upwardly in substantially the plane of the shield.

13. In a fender shield construction, a pair of trunnion members at the lower corners thereof for supporting the shield on a vehicle fender over the wheel opening thereof, one of said trunnion members being angularly movable in a plane substantially parallel to the plane of the shield between two positions in which it is operable as a trunnion, and means for forcing the movable end of said movable trunnion member toward the lower edge of said shield and for limiting movement away therefrom, whereby said shield may be supported on said fender by said trunnion members, and then may be swung first in a direction substantially perpendicular to and into the plane of said opening and may thereafter be forced upwardly in substantially the plane of the fender opening upon operation of said forcing means.

14. Supporting and securing means for detachably securing an ornamental fender shield to a vehicle fender, comprising supporting means for said shield which permits swinging thereof in a direction substantially perpendicular to the plane of the shield while supporting said shield, and additional means on said shield for preventing said swinging of said shield after said shield is assembled on said fender, said supporting means including oppositely extending arms arranged to engage underturned edges at the bottom of said fender, one of said arms being swingable with respect to said shield in a plane substantially parallel to the face of said shield and being limited to movement between two positions in both of which it projects far enough to engage one of said edges on said fender.

15. Supporting and securing means for detachably securing an ornamental fender shield to a vehicle fender, comprising supporting means for said shield which permits swinging thereof in a direction substantially perpendicular to the plane of the shield while supporting said shield, and additional means on said shield for preventing swinging of said shield after said shield is assembled on said fender, said supporting means including oppositely extending arms arranged to engage underturned edges of said fender, one of said arms being swingable with respect to said shield in a plane substantially parallel to the face of said shield, said movable arm being movable only between two fender shield supporting positions in one of which said additional means is in active engagement with said fender.

16. Supporting and securing means for detachably securing an ornamental fender shield to a vehicle fender, comprising supporting means for said shield which permits swinging thereof in a direction substantially perpendicular to the plane of the shield while supporting said shield, and additional means on said shield for preventing swinging of said shield after said shield is assembled on said fender, said supporting means including oppositely extending arms arranged to engage underturned edges of said fender, one of said arms being swingable with respect to said shield in a plane substantially parallel to the face of said shield, said movable arm being movable only between two fender shield supporting positions in one of which said additional means is in active engagement with said fender, and means for forcing said movable arm in a downward direction, said last means including a member rotatable with respect to said fender shield.

17. A fender shield comprising a panel adapted to close the wheel access opening in a fender, said panel having means near the top thereof inter-engageable with cooperating means on said fender by movement up with respect to said fender to its mounted position and disengageable by movement down to a second position below said mounted position, said means on said panel being constructed and arranged to prevent upward or outward or inward movement of the top of said panel when inter-engaged with said means on said fender and to permit outward swinging of the top of said panel when disengaged, and means projecting out at both sides of the bottom of said panel for supporting said panel on said fender in either said mounted position or in said second position, said supporting means including a supporting member vertically movable between two positions relative to said panel while in supporting engagement with said fender and manually operable means for positively preventing upward movement of said member relative to said panel while in either of said positions and for forcing said member down from the upper to the lower of said positions.

ARTHUR P. FERGUESON.